United States Patent
Bette et al.

(10) Patent No.: US 7,482,073 B2
(45) Date of Patent: Jan. 27, 2009

(54) CASCADE FUEL CELL SYSTEM

(75) Inventors: Willi Bette, Erlangen (DE); Detlev Coerlin, Erlangen (DE); Herbert Stenger, Burgthann (DE)

(73) Assignee: Siemens Aktiengesellschaft, Munich (DE)

( * ) Notice: Subject to any disclaimer, the term of this patent is extended or adjusted under 35 U.S.C. 154(b) by 295 days.

(21) Appl. No.: 10/381,703

(22) PCT Filed: Sep. 14, 2001

(86) PCT No.: PCT/DE01/03529

§ 371 (c)(1),
(2), (4) Date: Mar. 27, 2003

(87) PCT Pub. No.: WO02/27849

PCT Pub. Date: Apr. 4, 2002

(65) Prior Publication Data

US 2004/0023097 A1    Feb. 5, 2004

(30) Foreign Application Priority Data

Sep. 27, 2000    (DE) .............................. 100 47 914

(51) Int. Cl.
*H01M 8/00* (2006.01)
*H01M 2/00* (2006.01)
*H05K 7/00* (2006.01)

(52) U.S. Cl. ............................ 429/12; 429/34; 429/35; 361/733; 361/735

(58) Field of Classification Search .................. 429/34, 429/38, 18, 12; 204/196.09, 253, 267, 270; 206/722, 701; 361/434, 735, 733, 730
See application file for complete search history.

(56) References Cited

U.S. PATENT DOCUMENTS

| | | | | |
|---|---|---|---|---|
| 5,306,575 A | * | 4/1994 | Camara et al. | 429/16 |
| 5,413,878 A | * | 5/1995 | Williams et al. | 429/16 |
| 6,087,033 A | * | 7/2000 | Grune et al. | 429/37 |
| 6,101,988 A | * | 8/2000 | Evans | 123/41.5 |

FOREIGN PATENT DOCUMENTS

| | | |
|---|---|---|
| DE | 0 596 366 B1 | 5/1994 |
| EP | 0263052 * | 4/1988 |
| EP | 0 263 052 A1 | 6/1988 |
| EP | 0 459 165 A2 | 4/1991 |
| EP | 0459165 | 12/1991 |
| EP | 0 476 610 A2 | 3/1992 |
| EP | 0476610 | 3/1992 |

* cited by examiner

*Primary Examiner*—Raymond Alejandro
(74) *Attorney, Agent, or Firm*—Harness, Dickey & Pierce, P.L.C.

(57) ABSTRACT

A fuel cell installation includes a cascaded fuel cell block, for essentially waste gas-free operation. An installation of this type presents the problem that the cascaded fuel cell block is complex to produce and therefore expensive. To solve this problem, the fuel cell installation has several steps which are arranged in a cascade, each of the steps comprising one or more non-cascaded similar fuel cell blocks. A fuel cell installation construction including modular similar fuel cell blocks is economical and simple to produce in series.

15 Claims, 1 Drawing Sheet

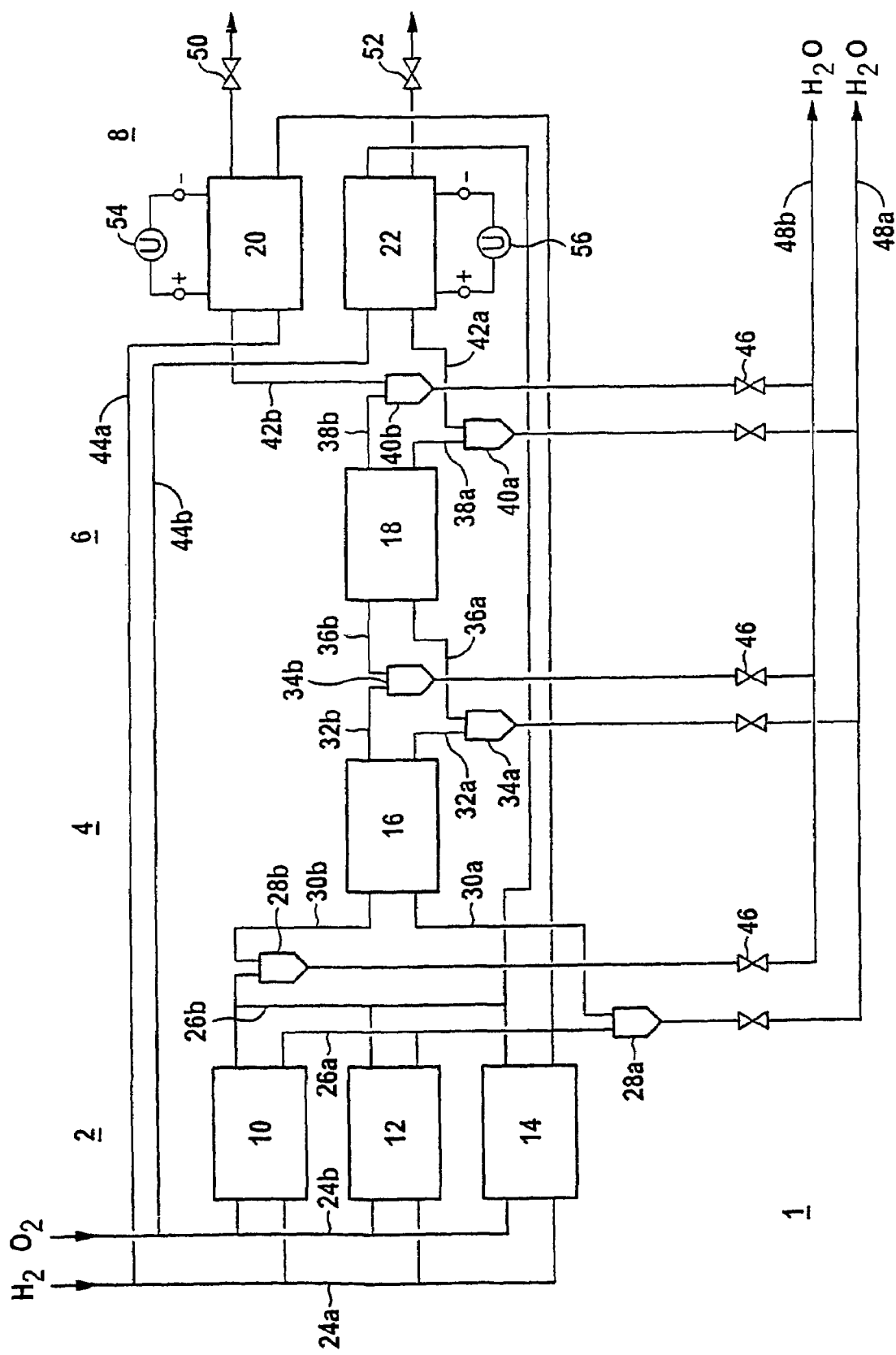

CASCADE FUEL CELL SYSTEM

This application is the national phase under 35 U.S.C. § 371 of PCT International Application No. PCT/DE01/03529 which has an International filing date of Sep. 14, 2001, which designated the United States of America and which claims priority on European Patent Application number DE 100 47 914.6 filed Sep. 27, 2000, the entire contents of which are hereby incorporated herein by reference.

FIELD OF THE INVENTION

The invention generally relates to a fuel cell system.

BACKGROUND OF THE INVENTION

In a fuel cell system having a number of fuel cells, electrical energy and heat are generated by hydrogen ($H_2$) and oxygen ($O_2$) being combined in an electrochemical reaction. For this purpose, hydrogen and oxygen are fed to the fuel cells, either in pure form or as fuel gas with a hydrogen content and as air. The type of operating gases which are fed to the fuel cell is mainly dependent on the operating environment in which the fuel cell system is operated. For example, if the fuel cell system is operated in a hermetically sealed space, it should be ensured that the fuel cell system produces the minimum possible amount of exhaust gases.

Since these exhaust gases will be unable to leave the hermetically sealed space, they have to be collected and possibly compressed. Therefore, a fuel cell system of this type is operated with pure oxygen and pure hydrogen, with a view to these operating gases, when the fuel cell system is operating, reacting to form water ($H_2O$) substantially without residues, so that the fuel cell system produces scarcely any exhaust gases.

The output produced by a fuel cell during operation is dependent, inter alia, on the quantity of operating gases which flow into the fuel cell. If the flow of operating gases into the fuel cell is low, the power output by the fuel cell is also low. As the supply of fuel gas increases, it is also possible for the output of the fuel cell to rise until a saturation value is reached. To achieve a good level of output from the fuel cell, it is necessary for more operating gases to be passed through the fuel cell than the fuel cell actually consumes during operation. It is therefore inevitable that an efficiently operated fuel cell will produce exhaust gases, namely at least the operating gases which have flowed through the fuel cells without being used.

EP 0 596 366 B1 has disclosed a fuel cell block having a multiplicity of fuel cells, the fuel cells of the block being combined in a plurality of groups of cells. When this fuel cell block is operating, the operating gases flow in parallel into the fuel cells of the first group. The exhaust gases from the fuel cells belonging to this group, which contain operating gases, are introduced in parallel into the fuel cells of a second cell group, and the exhaust gases from the second cell group are fed to a third cell group. In this way, the operating gases are consumed ever more completely from group to group. However, it has been found that producing what is known as a cascaded fuel cell block of this type is very complex.

SUMMARY OF THE INVENTION

Therefore, an object of an embodiment of the present invention is to provide a fuel cell system which is more simple to produce than that described in the prior art and which can be operated in such a way that it produces the minimum possible quantity of exhaust gases during operation.

An object may be achieved by a fuel cell system which, according to an embodiment of the invention, has a first stage and a second stage, each stage having at least one fuel cell block, an operating-gas feed and an operating-gas discharge, the operating-gas discharge of the first stage being connected to the operating-gas feed of the second stage.

In a first step, an embodiment of the invention is based on the consideration that the supply and removal of the fuel gases and of the product water formed to and from the individual fuel cell groups takes place through passages which lie within the cascaded fuel cell block. These passages are formed by specific shaping of the fuel cells, so that the shaping of the individual fuel cells is dependent on the nature and number of the passages formed through them. Numerous different feeds and discharges and therefore also a wide range of differently shaped fuel cells are required depending on how many cascaded groups a cascaded fuel cell block includes. This large number of different fuel cells makes the production of a cascaded fuel cell block considerably more expensive than the production of a fuel cell block which substantially only comprises cells of the same type. Piping up the individual fuel cell groups outside the cascaded fuel cell block solves this problem.

In a further step, an embodiment of the invention is based on the consideration that the production of different fuel cell systems, for example fuel cell systems with different outputs, is complex if a cascaded fuel cell block which is specifically designed for each fuel cell system has to be developed for the fuel cell system. Designing the individual fuel cell groups within the cascaded fuel cell block as independent fuel cell blocks makes it possible for a fuel cell system to be assembled in modular form from a number of fuel cell blocks. A greater or smaller number or larger or smaller fuel cell blocks are combined to form the fuel cell system depending on the power required from the fuel cell system. The fuel cell system therefore includes a plurality of stages, each having at least one fuel cell block through which the operating gases are guided successively in a cascaded arrangement.

The blocks belonging to one cascade stage are connected in parallel on the operating gas side, the exhaust gases from these blocks being fed to the following stage. Therefore, depending on the demands imposed on a fuel cell system, the fuel cell system is composed of a number of fuel cell blocks, different fuel cell systems differing substantially only in terms of the number of fuel cell blocks by which they are formed. As a result, the production of a fuel cell system which is required to produce the minimum possible quantity of exhaust gases is greatly simplified and as a result its costs are greatly reduced.

The fuel cell system is expediently constructed in modular form from fuel cell blocks of the same type. Fuel cell blocks of the same time are understood as meaning fuel cell blocks which are constructed in the same way in terms of the operating-gas passages in the blocks, the fuel cell shape and the connections for the supply and removal of fuel gases and the electrical connections. However, it is not necessary for the fuel cell blocks each to have the same number of fuel cells. Fuel cell blocks of this type can be produced in large numbers and at low cost in series production. The fact that the connections are of the same type means that piping between the individual fuel cell blocks can also be achieved at low cost using elements of the same type.

In an advantageous configuration of an embodiment of the invention, the fuel cell system includes an end stage, which has an operating-gas feed which is connected to an operating-gas discharge of the preceding stage and which has a further operating-gas feed, which is connected to an operating-gas feed of a preceding stage. An end stage is understood as meaning a stage with a fuel cell block which is designed to completely consume an operating gas in operation. In this context, the term "preceding" is to be understood as meaning that the operating gas fed to the end stage has already flowed through this preceding stage.

If, contrary to this configuration of an embodiment of the invention, only the exhaust gases from the second stage are fed to the third stage as operating gases, the hydrogen and the oxygen can only be consumed in the third stage if hydrogen and oxygen are in a precisely stoichiometric amount, i.e. in a 1:2 ratio, within the third stage. It has now been found that this stoichiometric ratio can only be set accurately with very great difficulty, in particular if the fuel cell system is subject to load changes. The result of a non-stoichiometric supply of the operating gases to the third stage is that one of the operating gases cannot be consumed completely. Therefore, this operating gas is blown out of the third stage during the disposal of inert gases which have accumulated over the course of time, and is consequently contained in the exhaust gas from the fuel cell system. This results in safety problems, in particular with a fuel cell system which is operated in a hermetically sealed space, as is the case, for example, in a submarine.

However, if, by way of example, the oxygen feed of the third stage is connected to the oxygen discharge of the second stage, but the hydrogen feed of the third stage is connected, for example, to the hydrogen feed of the first stage, the electrochemical reaction in the third stage is operated with the residual oxygen from the second stage and completely unused hydrogen gas. Therefore, in stoichiometric terms, the hydrogen is present in excess, with the result that the oxygen which is still present is completely consumed. Therefore, apart from a small quantity of inert gas, the cathode side of this fuel cell block has no exhaust gas. The anode-side exhaust gas, i.e. the excess hydrogen, is discharged from this third stage and introduced, for example, into the hydrogen feed of the first or second stage. The anode side of the end stage is therefore connected in parallel, on the gas side, with the anode side of the first stage.

With the third stage designed in this way, it is expedient for the third stage to include at least two fuel cell blocks, which each have an operating-gas feed which is connected to an operating-gas discharge of the preceding stage and which have a further operating-gas feed which is connected to an operating-gas feed of a preceding stage. Therefore, by way of example, in one of the two blocks, as described above, the oxygen is completely consumed, and analogously excess oxygen is fed to the other fuel cell block, so that the hydrogen is completely consumed. The result of this is that the fuel cell system can be operated with a very small quantity of exhaust gas on both the anode side and the cathode side. The exhaust gases are composed of nonreactive inert gases, which can be very thoroughly filtered out of the operating gases on both the cathode side and the anode side.

A further advantage can be achieved through the fact that the first stage has a first number of fuel cells, the second stage has a second number of fuel cells and the third stage has a third number of fuel cells, the first number being at least twice the second number and the second number being at least twice the third number. When the operating gases flow through a stage of the fuel cell system, a proportion of the operating gases is consumed. Therefore, a smaller amount of operating gases is available to the following stage. If a high output is demanded of the fuel cells, it is appropriate for excess operating gas to be passed through the fuel cell. Therefore, the fuel cell consumes only a proportion of the operating gas flowing through it. It has now been found that a favorable ratio between operating gas which is consumed in a stage and operating gas which flows through a stage is achieved if the number of fuel cells of a following stage is less than half the number in the preceding stage. 25% to 40%, in particular 30% to 35%, is an even better number for a following stage.

In a further configuration of the invention, the fuel cell blocks of the fuel cell system are designed for operation with pure oxygen ($O_2$) and pure hydrogen ($H_2$). Commercially available pure oxygen and pure hydrogen has only a very low inert gas content. If the fuel cell system is operated with these pure operating gases, it is therefore ensured that the fuel cell system can be operated in such a manner that only very small amounts of exhaust gases are formed.

In a further configuration of an embodiment of the invention, water separators are arranged between the stages. This has the advantage that the product water formed in the fuel cells and the condensation which is separated from the gas are not flushed into the fuel cells of the following stage. This effectively prevents the fuel cells from being flooded by water and thereby increases the efficiency of the fuel cells.

In a preferred configuration of an embodiment of the invention, a fuel cell block of the third stage is designed as a residual-gas disposal block. A device which controls the disposal of inert gas from the block is connected to a fuel cell block of this type. This is achieved, for example, by voltage monitoring of one or more fuel cells of the fuel cell block. If a relatively large quantity of inert gas accumulates in this fuel cell block, the voltage generated by this fuel cell block drops. When the voltage falls below a defined value, the inert gas disposal from the fuel cell block is initiated. It is also possible for two or more fuel cells of the residual-gas disposal block to be connected in parallel and for the current in these cells to be monitored. The current in these fuel cells connected in parallel is a measure of the extent to which they are filled with inert gas. When the current drops below a defined value, the residual-gas disposal from the fuel cell block is initiated.

BRIEF DESCRIPTION OF THE DRAWINGS

An exemplary embodiment of the invention is explained in more detail with reference to a drawing. The only FIGURE in the drawing diagrammatically depicts a fuel cell system 1.

DETAILED DESCRIPTION OF THE PREFERRED EMBODIMENTS

The FIGURE diagrammatically depicts a fuel cell system 1 which, in terms of the operating-gas supply and disposal, has four stages 2, 4, 6 and 8 connected in series. The first stage 2 includes three fuel cell blocks 10, 12, 14 which are connected in parallel on the operating gas side. The second stage 4 and the third stage 6 each have a single fuel cell block 16 and 18, respectively. The fourth stage 8 of the fuel cell system 1 has the two fuel cell blocks 20 and 22. In an alternative example embodiment, the first stage of the fuel cell may have one fuel cell block (e.g., as shown in stage 4) the following stage may have one fuel cell block (e.g., as shown in stage 6) and the final stage may have two fuel cell blocks (e.g., as shown in stage 8).

The fuel cell system is designed for operation with pure oxygen $O_2$ and pure hydrogen $H_2$. While the fuel cell system is operating, hydrogen $H_2$ flows through the line 24a in parallel into the three fuel cell blocks 10, 12, 14 of the stage of the fuel cell system 1 which is referred to below as first stage 2. Oxygen $O_2$ also flows through an operating-gas feed 24b, formed by lines, into the fuel cell blocks 10, 12, 14 of the first stage 2. A proportion of the operating gases hydrogen $H_2$ and oxygen $O_2$ is consumed in the first stage 2 of the fuel cell system 1 as a result of electrochemical reaction in the fuel cells of the fuel cell blocks 10, 12, 14. The remainder of the operating gases and product water and also a very small amount of inert gases are discharged from the fuel cell blocks 10, 12, 14 via the operating-gas discharges 26a and 26b. The hydrogen-containing exhaust gas flows through the operating-gas discharge line 26a into a water separator 28a and, from there, onward into the fuel cell block 16 of the second stage 4. The oxygen-containing exhaust gas from the fuel cell blocks 10, 12, 14 flows through the operating-gas discharge 26b into a water separator 28b and, from there, through the operating-gas feed 30b into the fuel cell block 16 of the second stage 4 of the fuel cell system 1.

The second stage 4 of the fuel cell system 1 includes two operating-gas discharges 32a and 32b, which are connected to the two operating-gas feeds 36a and 36b of the third stage 6 of the fuel cell system 1 via water separators 34a and 34b. The hydrogen-containing exhaust gas from the third stage 6 is fed via the operating-gas discharge 38a, the water separator 40a and the operating-gas feed 42a of the fourth stage 8 to the fuel cell block 22. The oxygen-containing exhaust gas from the third stage 6 is fed via the operating-gas discharge 38b, the water separator 40b and the operating-gas feed 42b of the fourth stage to the fuel cell block 20. The operating-gas feed 44a of the fourth stage 8 is directly connected to the operating-gas feed 24a of the first stage 2. The operating-gas feed 44b of the fourth stage 8 for the oxygen-containing operating gas is directly connected to the operating-gas feed 24b of the first stage 2.

The water which has been separated off by water separators 28a, 28b, 34a, 34b and 40a, 40b is discharged from the stages of the fuel cell system 1 via valves 46 which are of the same type and water discharge lines 48a and 48b.

The fuel cell blocks 10, 12, 14, 16, 18, 20, 22 are of the same construction. They have fuel cells which are both of the same type and of the same construction, and also operating-gas connections which are of the same type. The fuel cell blocks 10, 12, 14 and 16 each have 72 fuel cells, the fuel cell block 18 has 24 fuel cells and the fuel cell blocks 20 and 22 each have 8 fuel cells.

Therefore, the first stage 2 has 218 fuel cells, the second stage 4 has 72 fuel cells and the third stage 6 has 24 fuel cells. The fourth stage 8 has 2 times 8 fuel cells. With regard to the way in which the operating gases are guided, both the hydrogen $H_2$ and the oxygen $O_2$ in the first stage are passed in parallel through 218 fuel cells, in the second stage 4 are passed in parallel through 72 fuel cells, in the third stage 6 are passed in parallel through 24 fuel cells and in the fourth stage 8 are passed in parallel through 8 fuel cells.

The operating-gas feed 42b of the fourth stage 8 is used to supply oxygen-containing operating gas to the fuel cell block 20 which has a relatively high inert-gas content. Pure hydrogen $H_2$ is fed to the fuel cell block 20 through the operating-gas feed 44a of the fourth stage 8. While the hydrogen $H_2$ is passed through the fuel cell block 20 in excess, the flow of the oxygen-containing operating gas through the fuel cell block 20 is set in such a way that all the oxygen $O_2$ which is fed to the fuel cell block 20 through the operating-gas feed 42b is converted into water $H_2O$ in the fuel cell block 20 by reacting with the hydrogen $H_2$. The cathode exhaust gas from the fuel cell block 20 therefore contains inert gas, water and a very low residual oxygen content. It is discharged from the fourth stage 8 via the valve 50.

Oxygen $O_2$, which is passed through the fuel cells of the fuel cell block 22 in excess, is fed to the fuel cell block 22 via the operating-gas feed 44b. The flow of the hydrogen $H_2$ which passes through the operating-gas feed 42a into the fuel cell block 22 is set in such a way that substantially all the hydrogen $H_2$ is consumed in the fuel cell block 22. Therefore, the anode exhaust gas from the fuel cell block 22 substantially contains inert gases, water and a very low hydrogen content. It is discharged from the fourth stage 8 through the valve 52.

The two fuel cell blocks 20 and 22 of the fourth stage 8 are designed as residual-gas disposal blocks. They have voltage-monitors 54, 56 which in each case monitor the voltage of one or more fuel cells of the fuel cell block 20 and 22, respectively. The voltage-monitors 54 and 56 are connected to a control unit (not shown in more detail in FIG. 1) which also controls the valves 50 and 52. If the voltage of the monitored cell or cells drops below a defined value while the fuel cell system 1 is operating, the residual-gas disposal from the relevant cells is initiated as a result of the relevant valve 50 or 52 being opened.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A fuel cell system, comprising:
   a first stage; and
   a second stage succeeding the first stage, each of the first and second stages including at least one fuel cell block, an operating-gas feed and an operating-gas discharge, the operating-gas feed of the first stage being connected to a supply of pure hydrogen and pure oxygen and the operating-gas discharge of the first stage being connected to the operating-gas feed of the second stage such that each of the at least one fuel cell blocks of the first stage is connected in parallel to the at least one fuel cell blocks of the second stage,
   an end stage succeeding the second stage, wherein the end stage substantially consumes operating gases from preceding stages to minimize exhaust gases produced during operation of the fuel cell system,
   wherein the first stage includes a first number of fuel cells and the second stage includes a second number of fuel cells, the second number of fuel cells in the second stage, is from 30% to 35% of the first number of fuel cells in the first stage, and
   further wherein the fuel cell blocks are operated with pure oxygen and pure hydrogen and the fuel cell system is operated in a hermetically sealed space.

2. The fuel cell system as claimed in claim 1, further comprising:
   a third stage including at least one fuel cell block, an operating-gas feed and an operating-gas discharge, wherein the operating-gas discharge of the second stage is connected to the operating-gas feed of the third stage, the operating-gas discharge of the third stage is connected to an operating-gas feed of the end stage, and the number of fuel cells in the second stage is at least twice a number of fuel cells in the third stage.

3. The fuel cell system as claimed in claim 1, wherein each of the stages include the same type of fuel cell blocks.

4. The fuel cell system as claimed in claim 1, wherein the end stage includes an operating-gas feed connected to an operating-gas discharge of a stage preceding the end stage and a further operating-gas feed which is connected to an operating-gas feed of one of the preceding stage.

5. The fuel cell system as claimed in claim 4, wherein the end stage includes:
   at least two fuel cell blocks, each including an operating-gas feed connected to an operating-gas discharge of the stage preceding the end stage and a further operating-gas feed connected to an operating-gas feed of one of the preceding stage.

6. The fuel cell system as claimed in claim 1, wherein water separators are arranged between the stages.

7. The fuel cell system as claimed in claim 1, wherein the end stage has a fuel cell block and is a residual-gas disposal block.

8. The fuel cell system as claimed in claim 2, wherein each of the stages include the same type of fuel cell blocks.

9. The fuel cell system as claimed in claim 2, wherein the end stage includes a further operating-gas feed which is connected to an operating-gas feed of one of the preceding stage.

10. The fuel cell system as claimed in claim 9, wherein the end stage includes:
    at least two fuel cell blocks, each including an operating-gas feed connected to an operating-gas discharge of the stage preceding the end stage and a further operating-gas feed connected to an operating-gas feed of one of the preceding stage.

11. The fuel cell system as claimed in claim 2, wherein water separators are arranged between the stages.

12. The fuel cell system as claimed in claim 2, wherein the end stage has a fuel cell block and is a residual-gas disposal block.

13. The fuel cell system as claimed in claim 1, wherein operating gases are guided in parallel through the at least one fuel cell block of the first and second stages.

14. The fuel cell system as claimed in claim 1, wherein exhaust gases from the fuel cell system are reduced by adjusting the number of fuel cells in the second stage compared to the number of fuel cells in the first stage.

15. The fuel cell system as claimed in claim 1, wherein exhaust gases from the fuel cell system are reduced by decreasing the number of fuel cells in the second stage relative to the number of fuel cells in the first stage.

* * * * *